(12) United States Patent
Baucke

(10) Patent No.: US 9,033,671 B2
(45) Date of Patent: May 19, 2015

(54) WIND TURBINES AND WIND TURBINE ROTOR BLADES WITH REDUCED RADAR CROSS SECTIONS

(75) Inventor: Russell Craig Baucke, Loveland, OH (US)

(73) Assignee: General Electric Company, Schenectady, NY (US)

( * ) Notice: Subject to any disclaimer, the term of this patent is extended or adjusted under 35 U.S.C. 154(b) by 549 days.

(21) Appl. No.: 13/348,586

(22) Filed: Jan. 11, 2012

(65) Prior Publication Data

US 2013/0177434 A1 Jul. 11, 2013

(51) Int. Cl.
*F03D 11/00* (2006.01)
*F03D 1/06* (2006.01)
*H01Q 17/00* (2006.01)

(52) U.S. Cl.
CPC .............. *F03D 1/0675* (2013.01); *H01Q 17/00* (2013.01); *Y02E 10/721* (2013.01); *F03D 1/0683* (2013.01)

(58) Field of Classification Search
USPC ....... 416/223 R, 229 R, 230, 233, 232, 241 R
See application file for complete search history.

(56) References Cited

U.S. PATENT DOCUMENTS

| 5,151,222 | A | 9/1992 | Ruffoni |
| 7,841,835 | B2 | 11/2010 | Bagepalli et al. |
| 7,927,077 | B2 | 4/2011 | Olson |
| 2004/0048027 | A1 | 3/2004 | Hayes et al. |
| 2007/0268173 | A1* | 11/2007 | Randy ................. 342/2 |
| 2010/0296940 | A1* | 11/2010 | Zuteck ............ 416/226 |
| 2011/0223031 | A1 | 9/2011 | Bond |

FOREIGN PATENT DOCUMENTS

| GB | 2473020 | * | 2/2011 |
| WO | 2011024009 | A1 | 3/2011 |
| WO | 2011051687 | A2 | 5/2011 |
| WO | 2011138597 | A2 | 11/2011 |

\* cited by examiner

*Primary Examiner* — Edward Look
*Assistant Examiner* — Maxime Adjagbe
(74) *Attorney, Agent, or Firm* — Blake A. Nickles; Ernest G. Cusick; Frank A. Landgraff

(57) ABSTRACT

Wind turbine rotor blades include a shell having a leading edge opposite a trailing edge, a structural support member that supports the shell and is disposed internal the wind turbine rotor blade between the leading edge and the trailing edge and extends for at least a portion of a rotor blade span length, and a resistive cellular support structure disposed at least partially about the wind turbine rotor blade that physically supports at least a portion of the wind turbine rotor blade and at least partially absorbs radar energy.

17 Claims, 4 Drawing Sheets

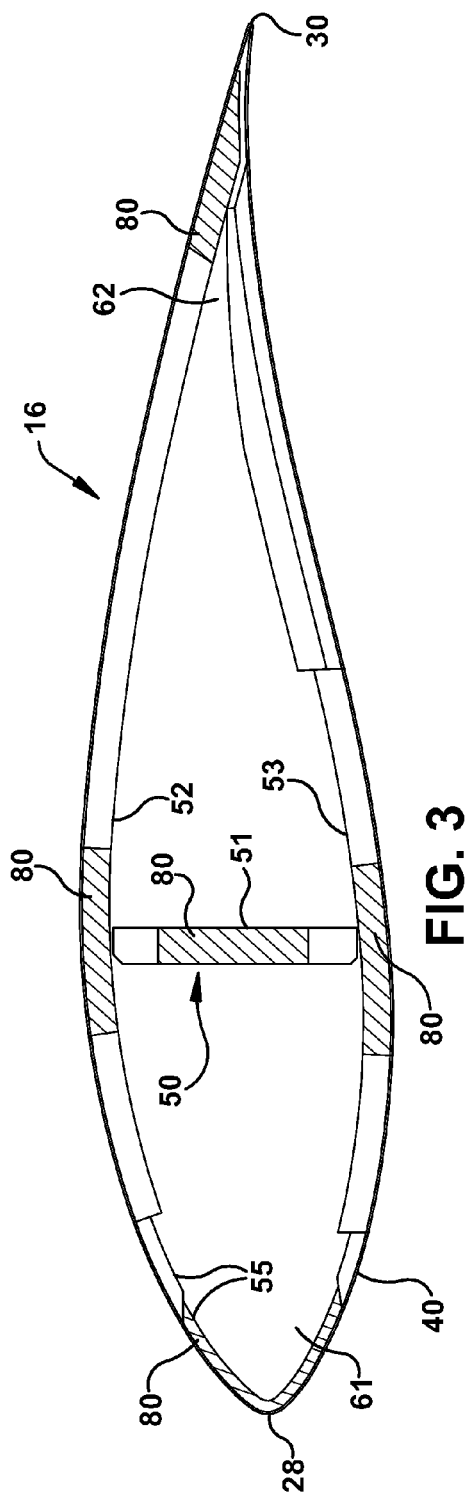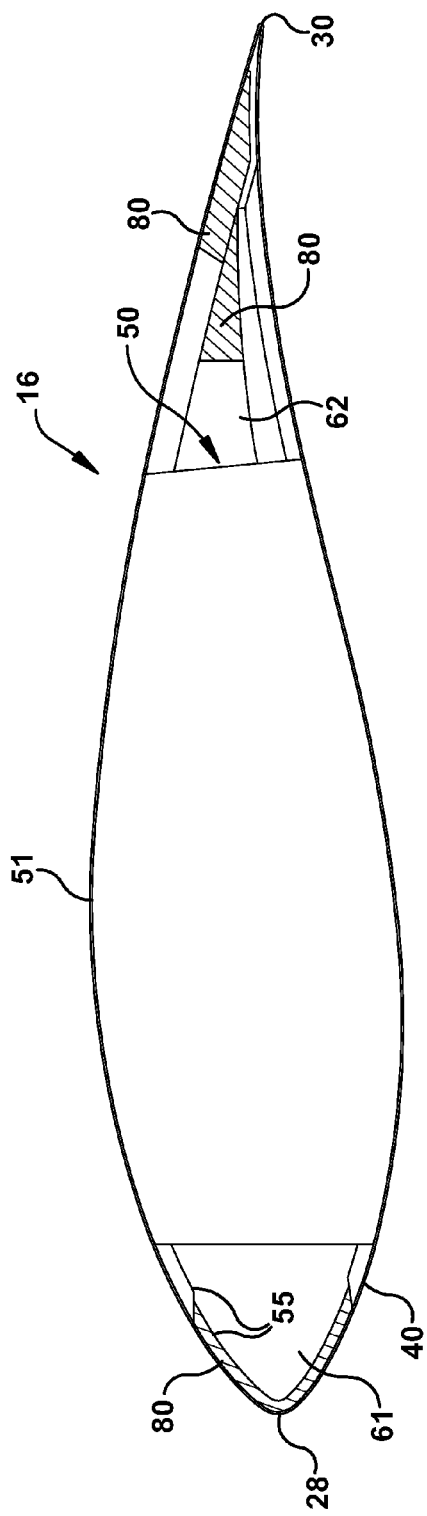

WIND TURBINES AND WIND TURBINE ROTOR BLADES WITH REDUCED RADAR CROSS SECTIONS

BACKGROUND OF THE INVENTION

The subject matter disclosed herein relates to wind turbines and, more specifically, to wind turbines and wind turbine rotor blades with reduced radar cross sections.

Wind power can be considered one of the cleanest, most environmentally friendly energy sources presently available, and wind turbines have gained increased attention in this regard. A wind turbine can include a tower, generator, gearbox, nacelle, and one or more rotor blades comprising a composite material. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbines can thus be placed in a variety of locations to effectively help capture the energy of wind power where present. These locations can include both on-shore and off-shore locations and may potentially be located in a wide variety of different topographical and geological positions. However, some position-based restrictions may inhibit the feasibility of placing wind turbines and certain locations. For example, radar stations and the like, such as those used at many airports, utilize open areas to capture radar feedback over great distances to monitor various activities such as air traffic. Placing wind turbines near such radar stations may result in consistent or occasional radar feedback due to the radar cross section of one or more components of the wind turbines and thereby impede the monitoring of space on the opposite side of such wind turbines.

Accordingly, alternative wind turbines and wind turbine rotor blades with reduced radar cross section would be welcome in the art.

BRIEF DESCRIPTION OF THE INVENTION

In one embodiment, a wind turbine rotor blade is provided. The wind turbine rotor blade includes a shell including a leading edge opposite a trailing edge and a structural support member that supports the shell and is disposed internal the wind turbine rotor blade between the leading edge and the trailing edge and extends for at least a portion of a rotor blade span length. The wind turbine rotor blade further includes a resistive cellular support structure disposed at least partially about the wind turbine rotor blade that physically supports at least a portion of the wind turbine rotor blade and at least partially absorbs radar energy.

In another embodiment, a wind turbine rotor blade is provided. The wind turbine rotor blade includes a shell including a leading edge opposite a trailing edge and a structural support member that supports the shell and is disposed internal the wind turbine rotor blade between the leading edge and the trailing edge and extends for at least a portion of a rotor blade span length. The wind turbine rotor blade further includes a first resistive cellular support structure disposed at least partially about a first location of the wind turbine rotor blade that physically supports at least a portion of the wind turbine rotor blade and at least partially absorbs radar energy and a second resistive cellular support structure disposed at least partially about a second location of the wind turbine rotor blade that physically supports at least a portion of the wind turbine rotor blade and at least partially absorbs radar energy.

In yet another embodiment, a wind turbine is provided. The wind turbine includes a nacelle including a rotor hub mounted on a tower and a plurality of wind turbine rotor blades connected to the rotor hub. At least one of the plurality of wind turbine rotor blades include a shell including a leading edge opposite a trailing edge, a structural support member that supports the shell and is disposed internal the wind turbine rotor blade between the leading edge and the trailing edge and extends for at least a portion of a rotor blade span length, and a resistive cellular support structure disposed at least partially about the wind turbine rotor blade that physically supports at least a portion of the wind turbine rotor blade and at least partially absorbs radar energy.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

FIG. 3 is a cross section view of a fiberglass based wind turbine rotor blade according to one or more embodiments shown or described herein;

FIG. 4 is a cross section view of a carbon fiber based wind turbine rotor blade according to one or more embodiments shown or described herein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Wind turbines and wind turbine rotor blades with reduced radar cross sections are disclosed herein. In particular, resistive cellular support structures can be incorporated into wind turbine rotor blades to provide a reduced radar cross section while also supporting the structure of the wind turbine rotor blade. For example, the reduced resistive cellular support structure can be disposed in one of a plurality of locations about the wind turbine rotor blade to reduce the radar cross section such as about the structural support member and/or the shell. Incorporating these resistive cellular support structures at one or more locations can allow the same wind turbine rotor blade to be disposed in different geographical areas that are subject to radar observation while still providing a viable structural support.

Figure 1:
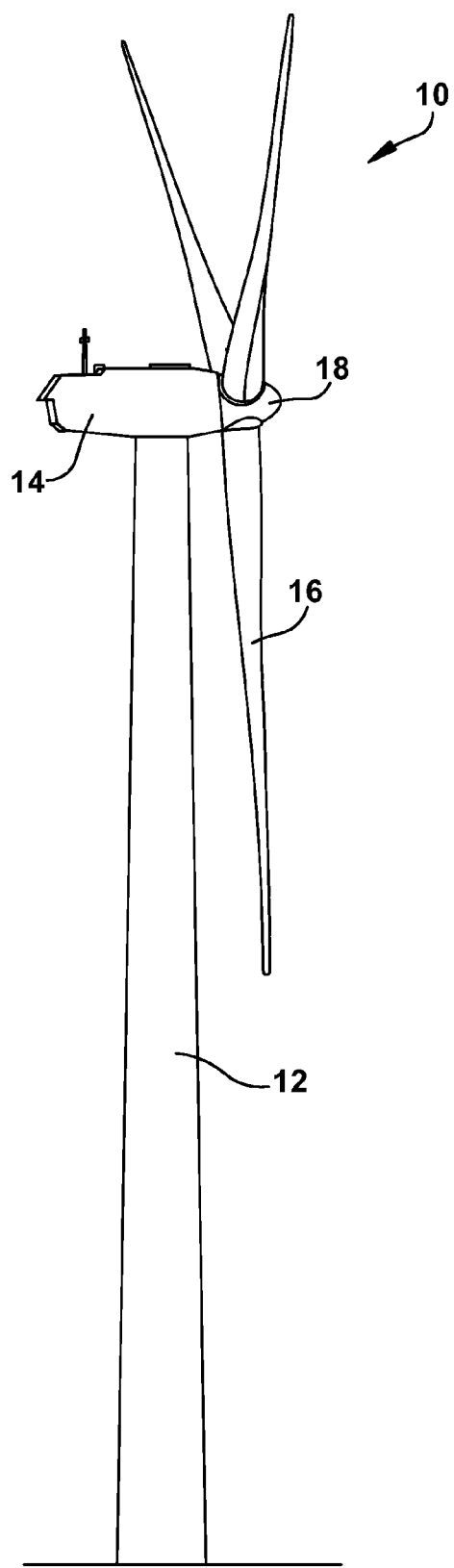
FIG. 1 is a perspective view of a wind turbine according to one or more embodiments shown or described herein.

Referring now to FIG. 1, a perspective view of a wind turbine 10 is illustrated. The wind turbine 10 can generally comprise a nacelle 14 mounted on a tower 12. A plurality of wind turbine rotor blades 16 can be mounted to a rotor hub 18 which can be connected to a main flange that turns a main rotor shaft (not illustrated). The wind turbine power generation and control components can be housed within the nacelle 14. It should be appreciated that the wind turbine 10 illustrated in FIG. 1 is provided for illustrative purposes only and not intended to limit the application of this disclosure to a specific wind turbine type or configuration.

Figure 2:
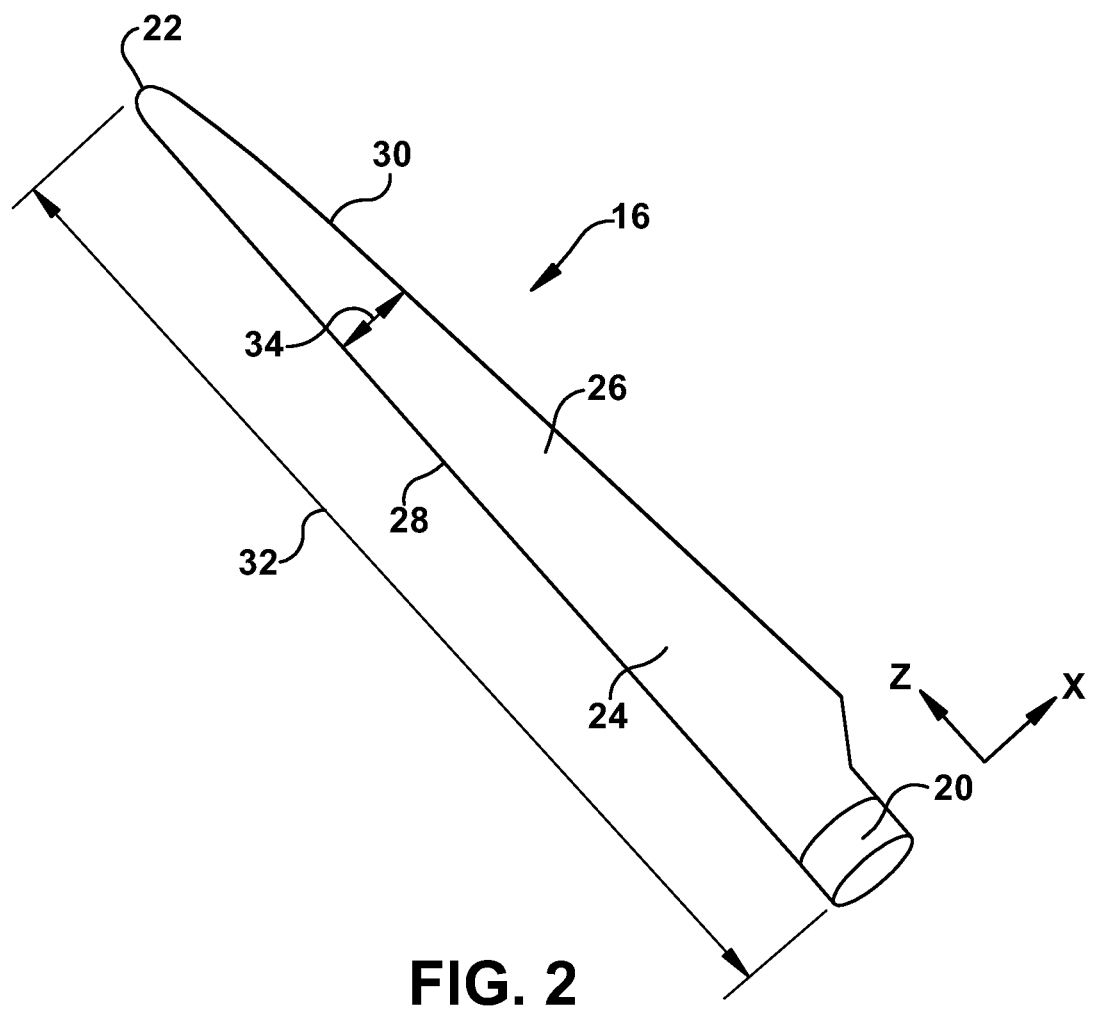
FIG. 2 is a perspective view of a wind turbine rotor blade according to one or more embodiments shown or described herein.

Referring now to FIG. 2, a perspective view of a wind turbine rotor blade 16 is illustrated. The wind turbine rotor blade 16 can include a blade root 20 for mounting the wind turbine rotor blade 16 to a mounting flange (not illustrated) of the wind turbine hub 18 (illustrated in FIG. 1) and a blade tip 22 disposed opposite the blade root 20. The wind turbine rotor blade 16 may comprise a pressure side 24 and a suction side 26 extending between a leading edge 28 and a trailing edge 30. In addition, the wind turbine rotor blade 16 may include a rotor blade span length 32 defining the total length between the blade root 20 and the blade tip 22. The wind turbine rotor blade 16 can further comprise a chord 34 defining the total length between the leading edge 28 and the trailing edge 30. It should be appreciated that the chord 34 may vary in length with respect to the rotor blade span length 32 as the wind turbine rotor blade 16 extends from the blade root 20 to the blade tip 22.

The wind turbine rotor blade 16 may define any suitable aerodynamic profile. Thus, in some embodiments, the wind turbine rotor blade 16 may define an airfoil shaped cross-section. For example, the wind turbine rotor blade 16 may also be aeroelastically tailored. Aeroelastic tailoring of the wind turbine rotor blade 16 may entail bending the wind turbine rotor blade 16 in generally a chordwise direction. The chordwise direction generally corresponds to a direction parallel to the chord 34 defined between the leading edge 28 and the trailing edge 30 of the wind turbine rotor blade 16. Additionally, the spanwise direction generally corresponds to a direction parallel to the rotor blade span length 32 of the wind turbine rotor blade 16. In some embodiments, aeroelastic tailoring of the wind turbine rotor blade 16 may additionally or alternatively comprise twisting the wind turbine rotor blade 16, such as by twisting the rotor blade 16 in generally the chordwise direction and/or the spanwise direction.

Referring now to FIGS. 3 and 4, the cross sections of wind turbine rotor blades 16 are illustrated. The structure of the wind turbine rotor blade 16 can generally comprise a shell 40 and a structural support member 50 disposed within the shell 40. As illustrated in FIGS. 2 and 3, the shell 40 can comprise the leading edge 28 opposite the trailing edge 30. The shell 40 can comprise any material that allows for the capture of incoming wind for rotating the wind turbine rotor blade 16 while being able to be supported by the structural support member 50. For example, in some embodiments the shell 40 can comprise a composite material. In some embodiments, the shell 40 can comprise a fiberglass material or a carbon fiber material. In even some embodiments, the shell 40 can comprise a plurality of layers (e.g., a plurality of fiberglass layers) that are connected to one another through adhesives (e.g., glues, tapes, etc.), mechanical fasteners (e.g., screws, bolts, etc.) or the like. While specific embodiments of wind turbine rotor blades 16 have been disclosed herein, it should be appreciated that these embodiments are not intended to be limiting and alternative wind turbine rotor blades 16 (e.g., using additional and/or alternative materials, designs or the like) should also be appreciated. Furthermore, in some embodiments, the wind turbine rotor blade 16 may further comprise one or more panels 55 to assist in the support of the shell 40.

In some embodiments, the shell 40 can comprise a plurality of layers held together by an adhesive such as an epoxy adhesive. In such embodiments, the amount of adhesive, or similar binder, may vary in amount by location. Thus some locations of the shell 40 may comprise a greater amount (e.g., a thicker amount) of adhesive as a result of the manufacturing and/or assembly process. Furthermore, the adhesive may also interact with radar such that the variations in amounts of adhesive may lead to variations in its radar cross section along the wind turbine rotor blade 16. While epoxy adhesives are specifically identified herein, it should be appreciated that other binders, fasteners or other remnants from manufacturing and/or assembly may similarly be disposed at least partially about the wind turbine rotor blade 16 in non-uniform amounts thereby producing variations in radar cross section by location.

Referring to FIGS. 2-4, the structural support member 50 may be disposed within the shell 40 between the leading edge 28 and the trailing edge 30 and extend for at least a portion of the rotor blade span length 32. The structural support member 50 can comprise any supportive member that is directly or indirectly connected to and supporting the shell 40 and may comprise one or more different materials.

For example, as illustrated in FIG. 3, in some embodiments the structural support member 50 can comprise fiberglass. In such embodiments, the structural support member 50 can comprise a spar 51 and one or more spar caps such as an upper spar cap 52 and a lower spar cap 53. The spar 51, the upper spar cap 52 and the lower spar cap 53 may extend for any length of the rotor blade span length 32 sufficient to support the overall wind turbine rotor blade 16. For example, in some embodiments the spar 51, the upper spar cap 52 and the lower spar cap 53 may extend substantially the entire length of the rotor blade span length 32 from the root 20 to the tip 22. In some embodiments, the spar 51, the upper spar cap 52 and the lower spar cap 53 may only extend for a portion of the rotor blade span length 32. In even some embodiments, the spar 51, the upper spar cap 52 and the lower spar cap 53 may extend for different lengths independent of one another such as when the upper spar cap 52 and the lower spar cap 53 extend for a length beyond the spar 51 towards the tip 22. Moreover, while embodiments comprising the spar 51, the upper spar cap 52 and the lower spar cap 53 have been presented herein, it should be appreciated that other embodiments may also be provided for structural support members comprising fiberglass such as comprising only one of these elements and/or comprising additional elements not already described herein.

In other embodiments, such as that illustrated in FIG. 4, the structural support member 50 may comprise a carbon fiber. In such embodiments, the structural support member 50 may comprise a single spar 51 (i.e., without the additional upper spar cap 52 and lower spar cap 53 illustrated in FIG. 3) which comprises the carbon fiber material. While specific materials have been presented herein, it should also be appreciated that additional and/or alternative materials may also be incorporated into the structural support member 50. Moreover, while embodiments comprising the spar 51 have been presented herein, it should be appreciated that other embodiments may also be provided for structural support members comprising carbon fiber such as comprising an upper spar cap, a lower spar cap and/or additional elements not already described herein.

Referring now to FIGS. 3 and 4, the wind turbine rotor blade 16 may further comprise one or more cavities 60 internal the wind turbine rotor blade 16. The one or more cavities 60 can comprise voids in the interior of the wind turbine rotor blade 16 that are not filled with structural support members 50 or other components of the wind turbine rotor blade 16. For example, in some embodiments there may be a leading edge cavity 61 adjacent the leading edge 28 of the wind turbine rotor blade 16. In some embodiments, there may additionally or alternatively be a trailing edge cavity 61 adjacent the trailing edge 30 of the wind turbine rotor blade 16. In other embodiments, additional and/or alternative cavities 60 may also be present internal the wind turbine rotor blade 16 such as near or around the structural support member 50. Moreover, in some embodiments, one or more of the cavities 60, such as the leading edge cavity 61 or the trailing edge cavity 62, may be divided into a plurality of sub cavities such that all or part of the cavity 60 may filled with radar absorbing materials as will become appreciated herein.

Figure 5:
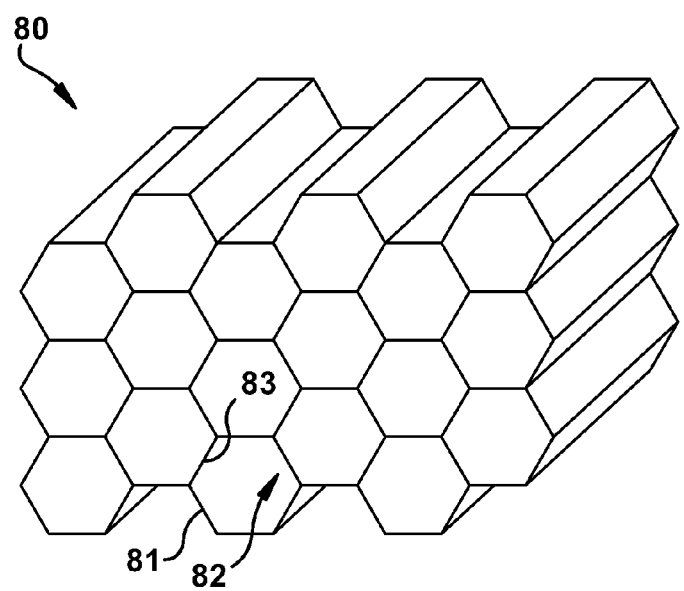
FIG. 5 is a perspective view of a resistive cellular support structure according to one or more embodiments shown or described herein.

Referring now to FIGS. 3-5, to assist in the reduction of the radar cross section of the wind turbine rotor blade 16 at one or more locations, the wind turbine rotor blade 16 may comprise a resistive cellular support structure 80 that can help physically support the wind turbine rotor blade 16 as well as reduce its radar cross section.

As best illustrated in FIG. 5, the resistive cellular support structure 80 can comprise a plurality of open structural cells 81 that physically support at least a portion of the wind turbine rotor blade 16. By supporting at least a portion of the wind turbine rotor blade 16, the plurality of open structural cells 81 carries at least part of the load from one or more components of the wind turbine rotor blade 16 such as the structural support member 50 and/or the shell 40. This can allow for the resistive cellular support structure 80 to replace and/or supplement existing support structures in the wind turbine rotor blade 16.

The plurality of open structural cells 81 can comprise open cells of any configuration that comprise a plurality of cell walls 83 that form cell passages 82. For example, as illustrated in FIG. 5, in some embodiments the plurality of open structural cells 81 may comprise a honeycomb configuration with the cell passages 82 in parallel alignment with one another, such as present in the commercially available C-RAM HC lightweight, structural broadband honeycomb radar absorber manufactured by Cuming Microwave Corporation. Such an embodiment may allow for various structural loading from a variety of directions such that the resistive cellular support structure 80 can help support one or more sections of the wind turbine rotor blade 16. In other embodiments, the plurality of open structural cells 81 may comprise other configurations such as triangular, circular, or any other geometrical or non-geometrical shape, or combinations thereof.

The cell walls 83 that form the cell passages 82 comprise a resistive material capable of absorbing radar energy. For example, in some embodiments the cell walls 83 can comprise carbon. In some embodiments, the cell walls 83 may comprise a variable amount of resistive material such that the amount of resistive material in the resistive cellular support structure 80 is non-uniform. The non-uniformity of the resistive material may be a result of the amount applied to individual cell walls 83, the sizing and spacing of cell walls 83 (e.g., where a more dense structure would provide a greater amount of resistive material), or any alternative resistive material incorporation method, or combinations thereof. By varying the amount and/or location of resistive material, the resistive cellular support structure 80 may reduce the radar cross section of at least a portion of the wind turbine rotor blade 16 by absorbing energy across a broad spectrum.

Referring to FIGS. 3 and 4, the resistive cellular support structure 80 may be disposed at least partially about the wind turbine rotor blade 16 at a plurality of locations. For example, in some embodiments, such as those wherein the structural support member 50 comprises fiberglass (as illustrated in FIG. 3), the structural support member 50 may at least partially comprise the resistive cellular support structure 80. Specifically, in a wind turbine rotor blade 16 having a structural support member 50 comprising fiberglass (as illustrated in FIG. 3), the spar 51, the upper spar cap 52, and/or the lower spar cap 53 may at least partially comprise the resistive cellular support structure 80. In other embodiments, irrespective of the configuration or material of the structural support member, the shell 40 and or panels 55 may at least partially comprise the resistive cellular support structure 80. For example, the resistive cellular support structure 80 may be disposed at least partially about the shell 40 and/or a panel 55 proximate the leading edge 28 and or the trailing edge 30. The resistive cellular support structure 80 may thereby extend for the entire rotor blade span length 32 or just a portion of the rotor blade span length 32 (such as only in the middle or tip 22 of the wind turbine rotor blade as opposed to the root 20). In some embodiments, the resistive cellular support structure 80 may be disposed in one or more cavities 60 such as the leading edge cavity 61 and/or the trailing edge cavity 62. In such embodiments, the resistive cellular support structure 80 may fill a portion of a cavity 60 (as illustrated in FIG. 4) or may fill the entire cavity 60 (not shown). Moreover, in some embodiments, the resistive cellular support structure 80 may have different orientations (i.e., the cell passages 82 are aligned in different directions) at different locations of the wind turbine rotor blade 16. Depending on the structural and resistive properties of the resistive structural support structure 80, this may allow for the specific support requirements of a given area in the wind turbine rotor blade 16 while still reducing its radar cross section.

It should now be appreciated that a resistive cellular support structure may be incorporated into a wind turbine rotor blade at one or more locations to reduce its radar cross section while also supporting part of the load. The incorporation of such structures can provide radar cross section reduction over one or more frequencies while supplementing or replacing the previous structural support to the wind turbine rotor blade. For example, by incorporating one or more of the radar cross section reduction features disclosed and described herein, the radar cross section of the wind turbine rotor blade may be reduced by at least 20 dB, or potentially even 25 dB, to better allow for placement near or around radar towers. Such resistive cellular support structures may thus be utilized in a variety of wind turbine rotor blades through maintaining, or even improving, their structural integrity while also allowing reduction in radar cross section to allow for deployment of the wind turbine rotor blades in a wider variety of areas. By incorporating one or more of the radar cross section reduction features disclosed and described herein, the radar cross section of the wind turbine rotor blade 16 may be reduced by at least 20 dB, or potentially even 25 dB, to better allow for placement near or around radar towers.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A wind turbine rotor blade comprising:
a shell comprising a leading edge opposite a trailing edge;
a structural support member that supports the shell and is disposed internal the wind turbine rotor blade between the leading edge and the trailing edge and extends for at least a portion of a rotor blade span length; and,
a resistive cellular support structure disposed at least partially about the wind turbine rotor blade that physically supports at least a portion of the wind turbine rotor blade and at least partially absorbs radar energy, wherein the resistive cellular support structure comprises a plurality of open structural cells comprising a plurality of cell walls that form a plurality of cell passages, and wherein the structural support member at least partially comprises the resistive cellular support structure.

2. The wind turbine rotor blade of claim 1, wherein the plurality of open structural cells comprise a honeycomb configuration.

3. The wind turbine rotor blade of claim 1, wherein the resistive cellular support structure comprises a variable amount of resistive material.

4. The wind turbine rotor blade of claim 1, wherein the structural support member comprises fiberglass.

5. The wind turbine rotor blade of claim 4, wherein the structural support member comprises a spar disposed between an upper spar cap and a lower spar cap.

6. The wind turbine rotor blade of claim 1, wherein the shell at least partially comprises the resistive cellular support structure.

7. The wind turbine rotor blade of claim 6, wherein the structural support member comprises carbon fiber.

8. A wind turbine rotor blade comprising:
a shell comprising a leading edge opposite a trailing edge;
a structural support member that supports the shell and is disposed internal the wind turbine rotor blade between the leading edge and the trailing edge and extends for at least a portion of a rotor blade span length;
a first resistive cellular support structure disposed at least partially about a first location of the wind turbine rotor blade that physically supports at least a portion of the wind turbine rotor blade and at least partially absorbs radar energy, wherein the first location comprises the structural support member; and,
a second resistive cellular support structure disposed at least partially about a second location of the wind turbine rotor blade that physically supports at least a portion of the wind turbine rotor blade and at least partially absorbs radar energy.

9. The wind turbine rotor blade of claim 8, wherein the second location comprises the shell.

10. The wind turbine rotor blade of claim 9, wherein the structural support member comprises fiberglass.

11. The wind turbine rotor blade of claim 9, wherein the structural support member comprises carbon fiber.

12. The wind turbine rotor blade of claim 8, wherein the first resistive cellular support structure has a first amount of resistive material and the second resistive cellular support structure has a second amount of resistive material greater than the first amount.

13. The wind turbine rotor blade of claim 8, wherein the first resistive cellular support structure has a first orientation and the second resistive cellular support structure has a second orientation different than the first orientation.

14. A wind turbine comprising:
a nacelle comprising a rotor hub mounted on a tower;
a plurality of wind turbine rotor blades connected to the rotor hub, wherein at least one of the plurality of wind turbine rotor blades comprises:
a shell comprising a leading edge opposite a trailing edge;
a structural support member that supports the shell and is disposed internal the wind turbine rotor blade between the leading edge and the trailing edge and extends for at least a portion of a rotor blade span length; and,
a resistive cellular support structure disposed at least partially about the wind turbine rotor blade that physically supports at least a portion of the wind turbine rotor blade and at least partially absorbs radar energy, wherein the resistive cellular support structure comprises a plurality of open structural cells comprising a plurality of cell walls that form a plurality of cell passages, and wherein the structural support member at least partially comprises the resistive cellular support structure.

15. The wind turbine of claim 14, wherein each of the plurality of wind turbine rotor blades comprises the resistive cellular support structure.

16. The wind turbine of claim 14, wherein the plurality of open structural cells comprise a honeycomb configuration.

17. The wind turbine of claim 14, wherein the resistive cellular support structure comprises a variable amount of resistive material.

* * * * *